April 2, 1963  E. L. C. DESTINAY ETAL  3,083,749
TIRE
Filed April 21, 1960

Edouard Loureanto Charles Destinay
Jean Louis Renaudie
INVENTORS

BY Paul H. Blaustein

ATTORNEY

United States Patent Office 3,083,749
Patented Apr. 2, 1963

3,083,749
TIRE
Edouard L. C. Destinay and Jean L. Renaudie, Compiegne, France, assignors to Societe Francaise du Pneu Englebert, Margny-Les-Compiegne, France, a corporation of France
Filed Apr. 21, 1960, Ser. No. 23,784
Claims priority, application France Apr. 23, 1959
4 Claims. (Cl. 152—361)

This invention relates to an improved belted tire.

Tires of the type shown in Patent No. 2,493,614 to Bourdon include three layers of parallel metallic wires extending in different directions. These layers form the belt which underlies the tread. Rigidity imparted by this triangulated arrangement practically prevents any deformation of one layer with regard to the other in the manner of a scissors, thereby considerably reducing the suppleness of the tire.

The same result is obtained if one of the layers of wires is replaced by a hard rubber layer as shown in Patent No. 2,811,998 to Bourdon. In this case, the belt is formed by superposing two layers of parallel metallic wires in directly adjacent relationship and embedding these layers in a rubber mass with a Shore hardness of more than 72, so that the direction of the wires of one layer is inclined with regard to the direction of the wires of the other. The purpose of using hard rubber is to prevent any shearing movement between the layers and to keep all the wires fixed in position relative to each other.

Such constructions substantially eliminate relative motion between layers. The tire thus becomes rigid and hard riding, which is detrimental to the suspension of certain vehicles and to the comfort of the passengers riding therein.

It is therefore an object of this invention to provide a belted tire which provides a more comfortable ride.

Other objects and advantages of this invention will become apparent from the following description taken in connection with the accompanying drawings, wherein are set forth, by way of illustration and example, certain embodiments of this invention.

The tire of this invention has a textile or metallic ply carcass and a tread and is principally characterized in that it also comprises a belt between the carcass and the tread. The belt has at least two layers of independent and parallel metal bands. The two layers are embedded in a rubber mass with a Shore hardness of less than 70 and preferably close to 62. The direction of the bands of one layer forms only a small angle with the direction of the bands of the other layer.

According to the invention the layers can have a slight angular displacement with regard to each other, thus imparting to the tread of the tire a suppleness compatible with a long duration of use.

Figure 1:
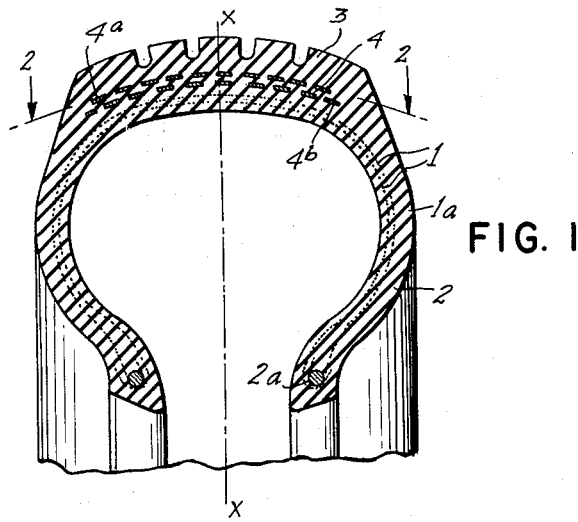
FIG. 1 shows a fragmentary section of a tire according to this invention.
Figure 2:
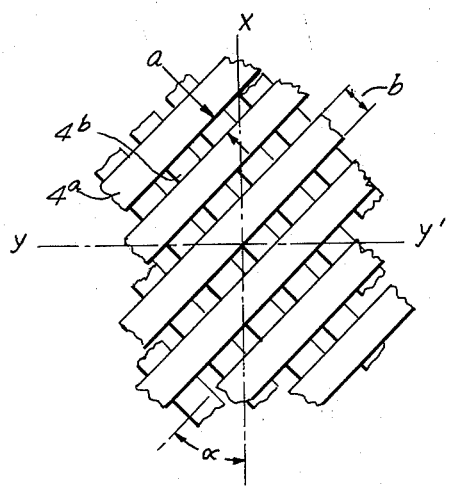
FIG. 2 is a partial view of the belt along line 2—2 of FIG. 1 showing the inclination of the sheets.

As can be seen from FIGS. 1 and 2, the tire comprises a radial textile ply 1 in a carcass 1a and a tread 3. A belt 4 consists of at least two layers 4a and 4b of metal bands (solid or perforated), with the bands within each layer independent and parallel to each other. The two layers are placed in a rubber mass having a Shore hardness of less than 70, and preferably close to 62. The bands of one layer form only a small angle with the direction of the bands of the other layer. The angle between the direction of the bands of the two layers is at most 60°.

Although a certain angular displacement of one layer with respect to the other is desirable, as mentioned above, it is essential that this displacement be limited to avoid heating which might result in premature destruction of the tire.

As shown in FIG. 1, the equatorial plane X—X is perpendicular to the axis about which the tire rotates. The angle alpha ($\alpha$) as shown in FIG. 2, is the angle between the bands 4a and the equatorial plane X—X. Since the equatorial rigidity (rigidity in plane X—X) diminishes as the angle alpha increases, resulting in an increase in the transverse rigidity, it is necessary to limit the value of the angle alpha. (Transverse rigidity is the rigidity in a plane transverse to X—X and would be substantially along the tread plane.) Experience has shown that the angle alpha should have a value between 10 and 30 degrees.

The transverse rigidity is also a function of a second parameter: the distance "$a$" between bands. This distance can be at most equal to the width "$b$" of a single band. The smaller this distance, the higher the transverse rigidity; a satisfactory value corresponds to a distance $a=b/2$.

It should be noted that the use of bands produces effects which cannot be compared with those obtained with round wires, due to the difference of the moments of inertia of their sections. A layer of bands, such as is used in this invention, has a high transverse moment of inertia (resistance to flexure in its own plane), while the moment of inertia of a layer of round wires is much lower.

Figure 3:
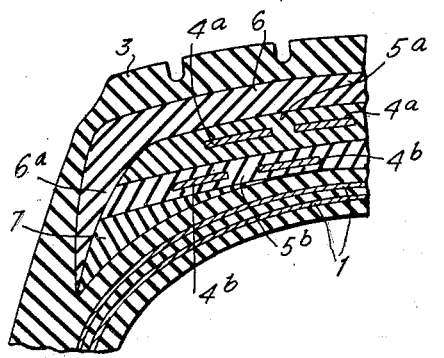
FIG. 3 is a section on an enlarged scale of a modification of the tire shown in FIG. 1.

According to the modification shown in FIG. 3, the belt 4 comprises two layers 4a and 4b of parallel metal bands, each placed in a mass of rubber 5a and 5b, respectively, having a Shore hardness of less than 70, and preferably close to 62. A second belt of rubber 6 is placed between belt 4 and the tread 3. The rubber of belt 6 is substantially harder than the rubber of the tread. Belts 4 and 6 are separated by a rubber layer of medium hardness (Shore hardness less than 62) to ensure their independence. Rubber belt 6 preferably encloses belt 4 laterally by means of two borders 6a which surround belt 4. A pad 7, placed under each of the lateral edges of belt 4, prevents bands 4b from approaching the carcass.

Having thus described our invention, what we claim and desire to protect by Letters Patent is:

1. A tire comprising
   a carcass,
   a tread,
   a circumferential belt between said carcass and said tread, said belt comprising
      two layers of independent and parallel metal bands,
         said two layers being embedded in a hard rubber mass,
            said mass being harder than the rubber of said tread but having a Shore hardness less than 70,
         said bands being spaced apart by a distance less than the width of a band,
         the direction of the bands of one layer forming an angle with the direction of the bands of the other layer,
   a second circumferential belt of rubber between said tread and the first-mentioned circumferential belt,
      the rubber of said second belt being substantially harder than the rubber of said tread,
      said second belt having borders which enclose said first belt laterally, and
   a pad of rubber located under each lateral edge of said first belt and bearing against said borders of said second belt and against said carcass.

2. A tire as described in claim 1, in which the direction of the bands of each layer forms an angle of between 10 and 30 degrees with the equatorial plane of the tire.

3. A tire as described in claim 1, in which said bands are perforated.

4. A tire as described in claim 1, in which said bands are spaced apart a distance equal to one-half the width of a band.

References Cited in the file of this patent

UNITED STATES PATENTS

| | | |
|---|---|---|
| 840,503 | Marks | Jan. 8, 1907 |
| 1,188,062 | Gammeter | June 20, 1916 |
| 1,428,726 | Warth | Sept. 12, 1922 |
| 2,083,003 | Budd | June 8, 1937 |
| 2,811,998 | Bourdon | Nov. 5, 1957 |

FOREIGN PATENTS

| | | |
|---|---|---|
| 770,315 | Great Britain | Mar. 20, 1957 |